United States Patent [19]

Staar

[11] Patent Number: 4,513,409
[45] Date of Patent: Apr. 23, 1985

[54] HELICOIDAL LOADING AND UNLOADING MECHANISM FOR DISC PLAYER APPARATUS

[75] Inventor: Marcel J. Staar, Brussels, Belgium

[73] Assignee: Staar S. A., Belgium

[21] Appl. No.: 454,240

[22] Filed: Dec. 29, 1982

[30] Foreign Application Priority Data

Dec. 29, 1981 [BE] Belgium ............................. 891649

[51] Int. Cl.³ ............................................ G11B 25/04
[52] U.S. Cl. ................................................. 369/77.1
[58] Field of Search ................... 369/77.1, 63, 65, 66, 369/67

[56] References Cited

U.S. PATENT DOCUMENTS

| | | | |
|---|---|---|---|
| 2,100,686 | 11/1937 | Collaro et al. | 369/77.1 |
| 3,658,347 | 4/1972 | Cheeseboro | 369/77.1 |
| 4,225,141 | 9/1980 | Torrington et al. | 369/77.2 |

Primary Examiner—Steven L. Stephan
Attorney, Agent, or Firm—Leydig, Voit, Osann, Mayer and Holt, Ltd.

[57] ABSTRACT

Loading and unloading mechanism for slot type disc player apparatus incorporates a device for transferring a disc to the disc drive after it has been inserted through a slot and for transferring the disc from the disc drive and ejecting it through the slot after the playing operation has been completed. A disc carrier plate is mounted on the frame of the apparatus for helical movement between a first position adjacent the slot and a second position adjacent the disc drive. A spring or a motor provides power to rotate the carrier plate, which rotational movement is translated to helical movement by helical ramp members and cooperating bearing members. Control devices are included to provide automatic operation.

28 Claims, 25 Drawing Figures

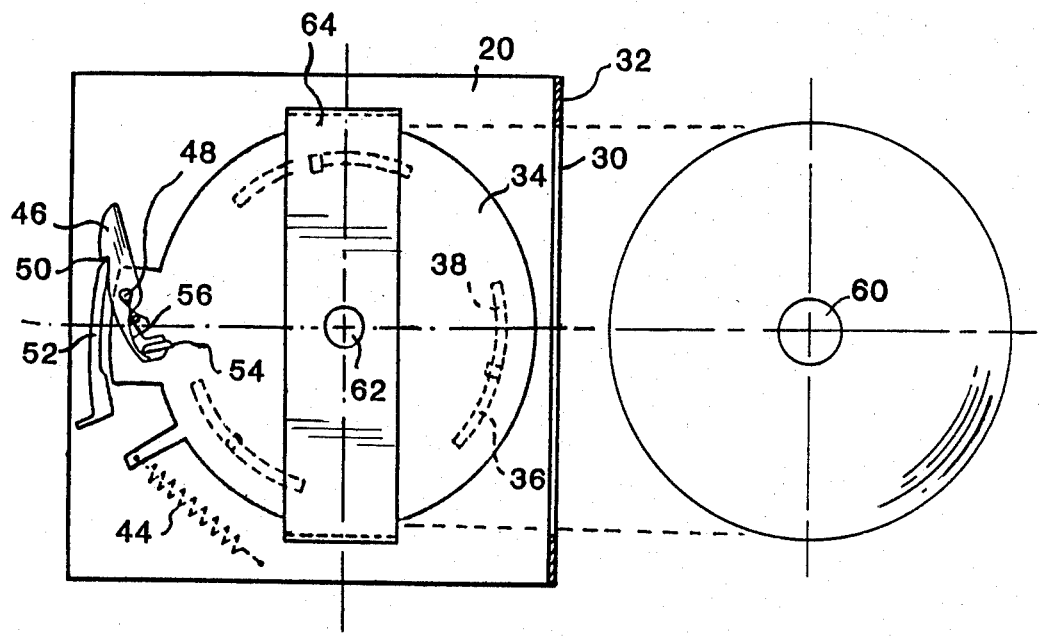
FIG. 1
FIG. 2
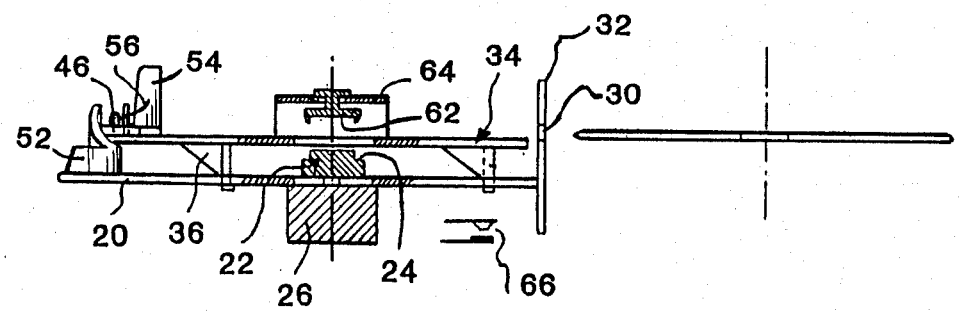
FIG. 3
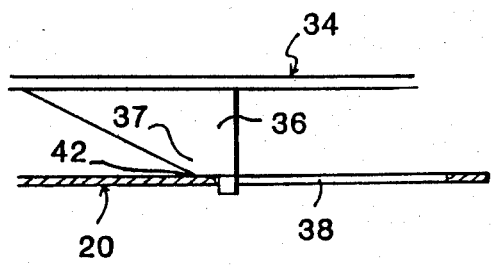

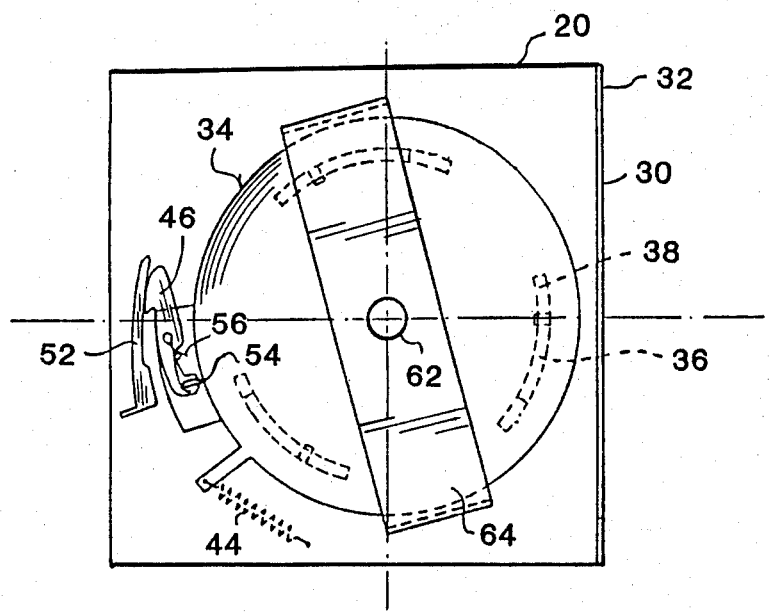
FIG. 5
FIG. 6
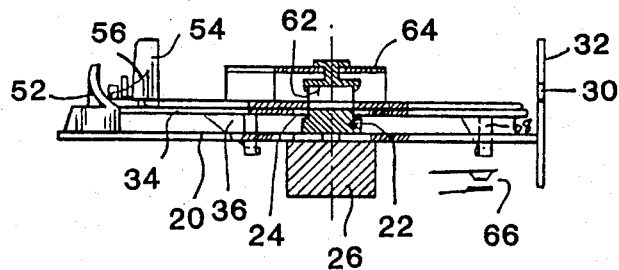
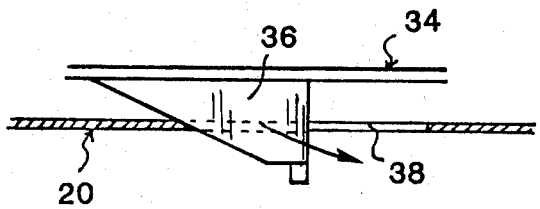
FIG. 7

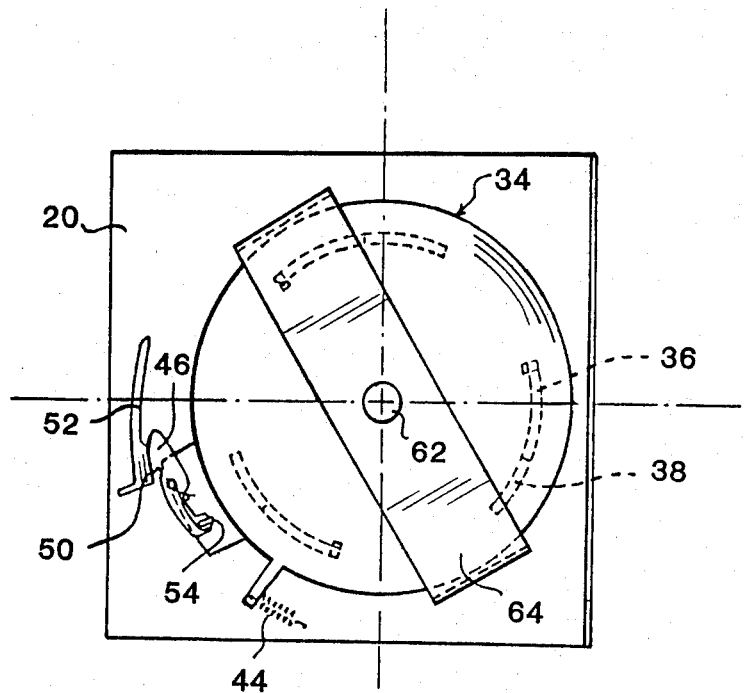
FIG. 8
FIG. 9
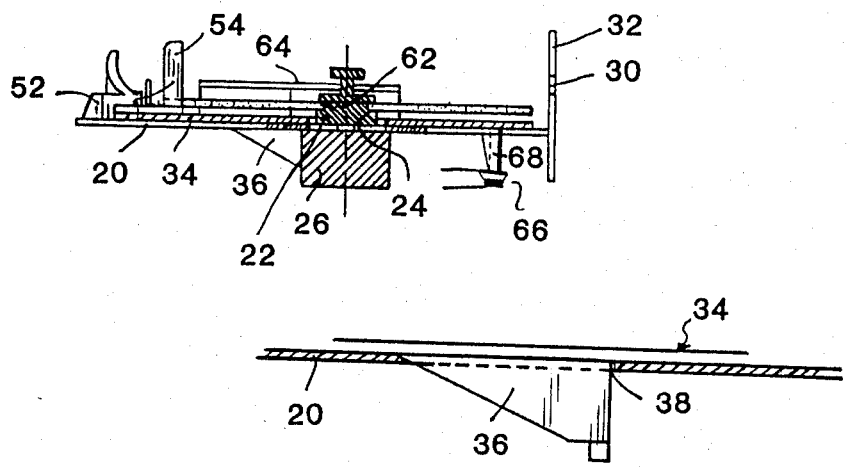
FIG. 10

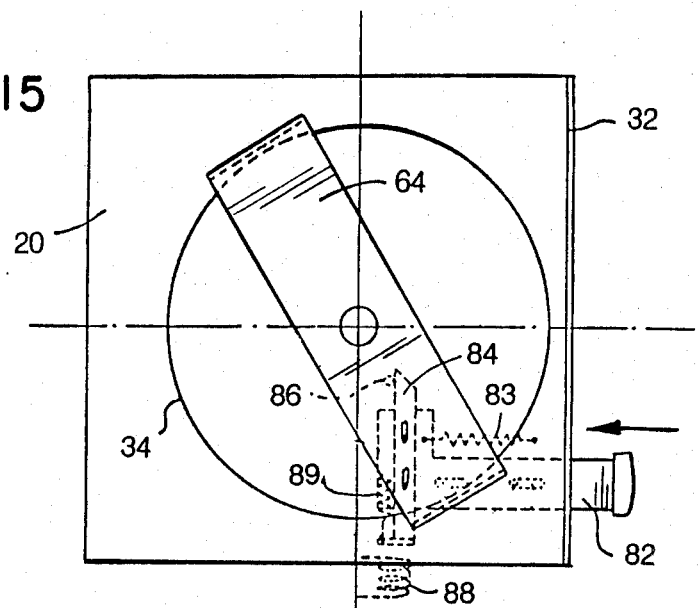
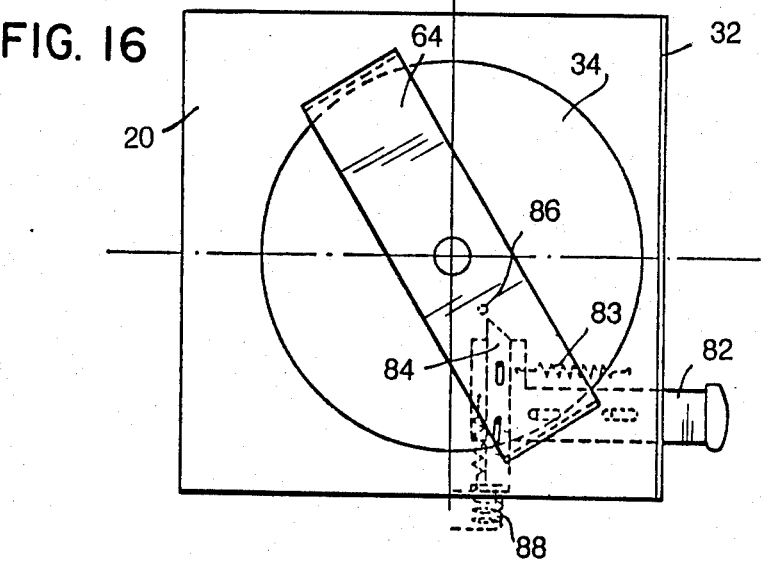
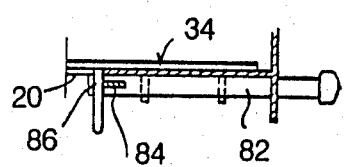

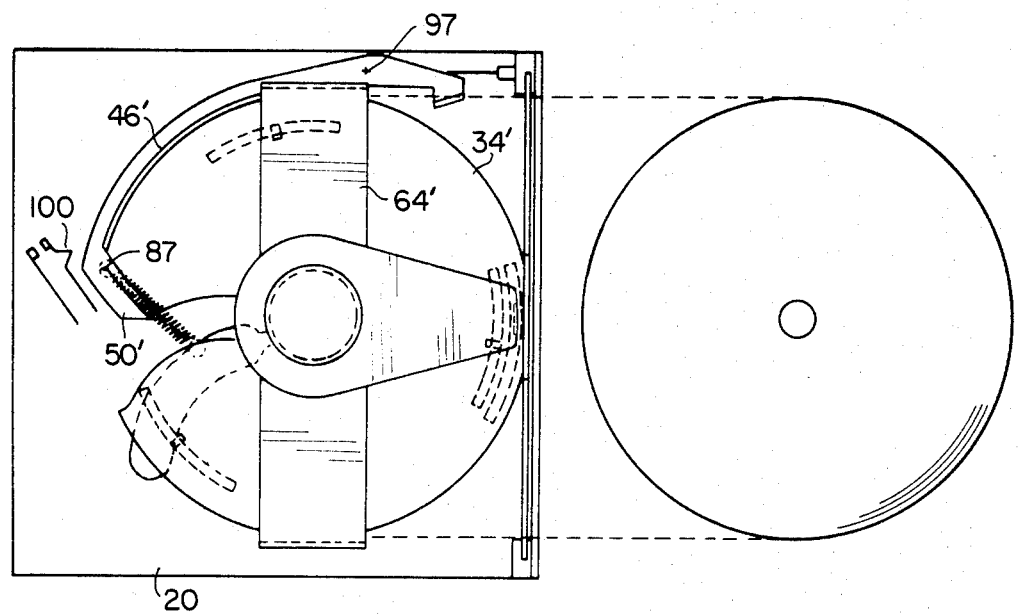
FIG. 18
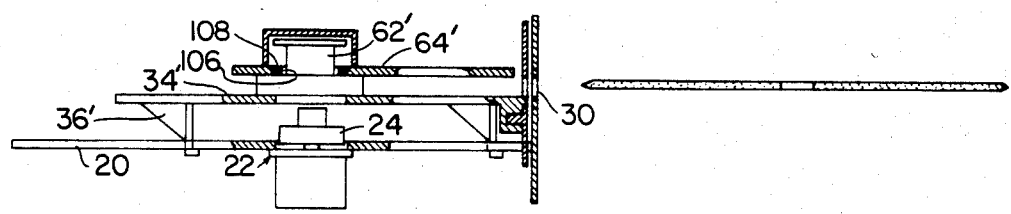
FIG. 19
FIG. 20
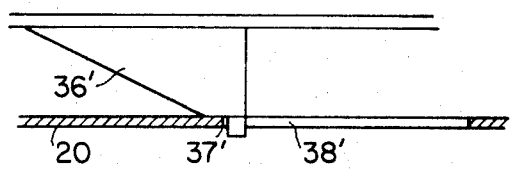

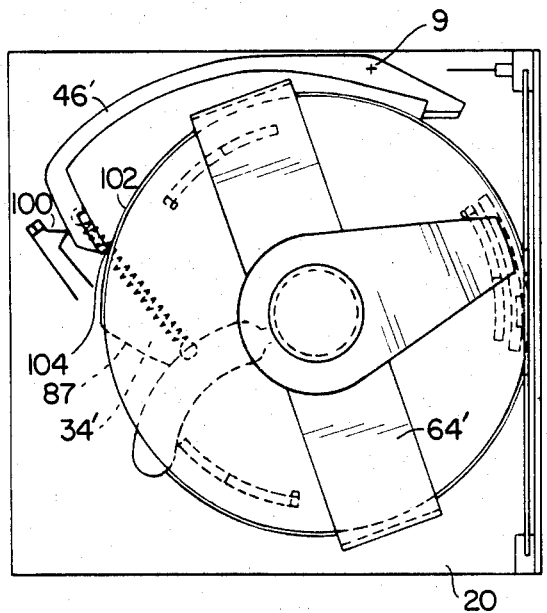
FIG.22
FIG.23
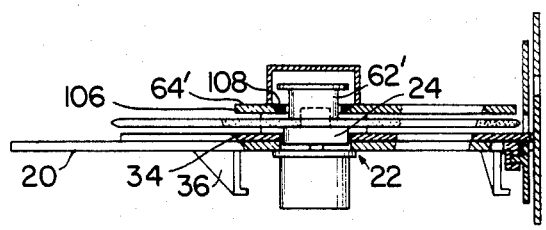
FIG.24
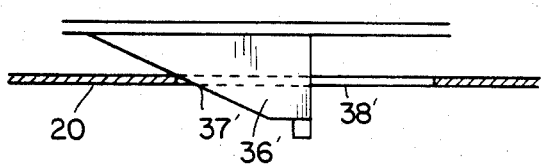
FIG.25
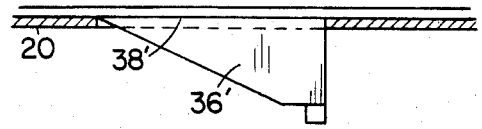

HELICOIDAL LOADING AND UNLOADING MECHANISM FOR DISC PLAYER APPARATUS

TECHNICAL FIELD

This invention relates to disc player apparatus and, more particularly, to such apparatus of the slot-type having a device for automatically transferring a disc to a disc drive after the disc has been inserted through a slot or transferring the disc from the disc drive and ejecting it through the slot.

BACKGROUND ART

Player apparatus of the slot type which have reached the market have been complex and, therefore, not well suited for mass production. Furthermore, the devices utilized in such apparatus for transferring a disc to and from the disc drive for both loading and unloading appear to handle the discs with less care than when they are handled manually.

For these and other reasons, no high-quality disc player apparatus of the slot-type having an automatic loading and unloading device is presently on the market.

DISCLOSURE OF INVENTION

The main object of this invention is to provide a loading and unloading device for slot type player apparatus which mechanically transfers the disc to and from a disc drive and handles the disc with care so as to be suited for high quality player apparatus.

Another object is to provide such a device which is well suited to low cost mass production.

Another object is to provide such a device which automatically transfers the disc to and from the disc drive of the apparatus and minimizes the risk of damage to the disc or recording grooves therein by eliminating the need for manually handling the disc.

BRIEF DESCRIPTION OF THE DRAWINGS

Further objects will appear from the following description taken in connection with the accompanying drawings, in which:

FIG. 1 is a horizontal plan view of a loading and unloading device incorporating the invention for a slot type disc player apparatus and illustrates a disc prior to being inserted;

FIG. 2 is a vertical sectional view taken substantially in the plane of lines 2—2 in FIG. 1;

FIG. 3 is an enlarged fragmentary view illustrating the inclined ramp member and bearing member utilized in the device of FIG. 1;

FIG. 5 is a horizontal plan view similar to FIG. 1 with the disc carrier plate advanced to an intermediate phase in the course of transferring a disc to the disc drive;

FIG. 6 is a vertical sectional view of the device in the intermediate phase shown in FIG. 5 and is taken substantially in the plane of lines 6—6 in FIG. 5;

FIG. 7 is a fragmentary view of the ramp member and bearing member of the device in the intermediate phase illustrated in FIGS. 5 and 6;

FIG. 8 is a horizontal plan view similar to FIGS. 1 and 5 with the disc carrier plate advanced to a phase where the disc is in position on the disc drive;

FIG. 9 is a vertical sectional view similar to FIGS. 2 and 6 of the device in the phase illustrated in FIG. 8;

FIG. 10 is a fragmentary view of the ramp member and bearing member in the phase of the device illustrated in FIGS. 8 and 9;

FIG. 15 is a horizontal plan view of the device illustrated in FIG. 8 with parts removed, including an illustration of an actuating mechanism for returning the disc carrier to unload a disc from the disc drive of the device;

FIG. 16 is a horizontal plan view similar to FIG. 15 illustrating the mechanism in an advanced phase during the return operation;

FIG. 17 is a fragmentary sectional view of the mechanism shown in FIG. 16 taken substantially in the plane of lines 17—17 in FIG. 16;

FIG. 18 is a horizontal plan view similar to FIG. 1 of an alternative and preferred embodiment of a loading and unloading device incorporating the invention;

FIG. 19 is a vertical sectional view of the device taken substantially in the plane of lines 19—19 in FIG. 18;

FIG. 20 is a fragmentary view of the ramp member and bearing member of the device shown in FIG. 18;

FIG. 22 is a horizontal plan view similar to FIG. 18 with the device advanced in phase with the disc in operating position on the disc drive;

FIG. 23 is a vertical sectional view taken substantially in the plane of lines 23—23 in FIG. 22; and FIGS. 24 and 25 are views similar to FIG. 20 of the ramp member and bearing member in intermediate and final operating phases of the device of FIGS. 18-21.

BEST MODE FOR CARRYING OUT THE INVENTION

Figure 4:
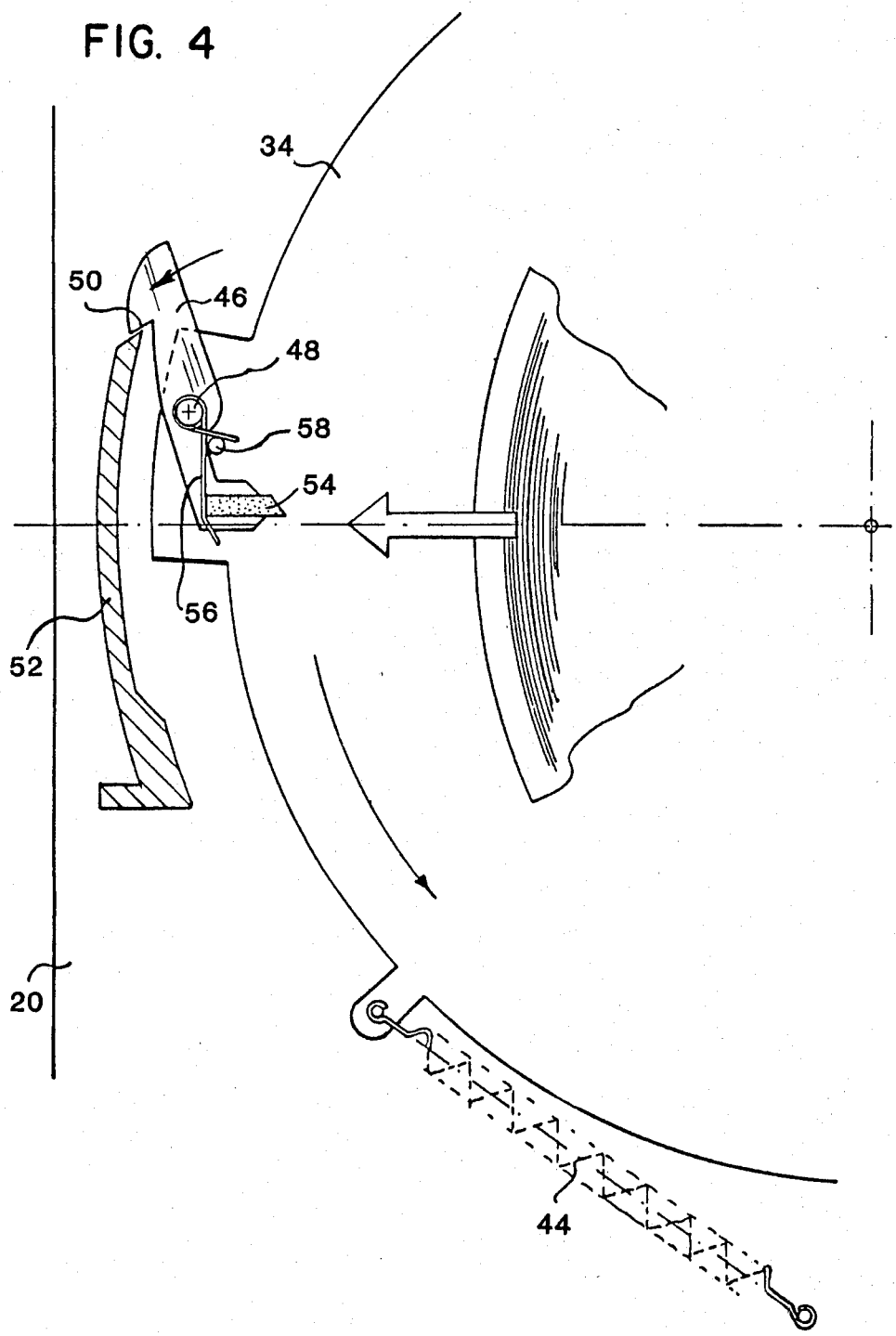
FIG. 4 is an enlarged fragmentary plan view of the retainer mechanism included in the device of FIG. 1.

Referring to FIGS. 1 and 9, these Figures illustrate a player apparatus having a frame 20 on which is supported a rotary disc drive including a rotary hub 24 operated by power by means such as a motor 26. This apparatus is intended particularly, but not exclusively, for discs having digital recordings in grooves intended to be reproduced by laser transducers which read the grooves in the underside of the disc as the disc is rotated at high speed by the disc drive when the disc is in operating position, as illustrated in FIG. 9. In its operating position the disc is clamped to the rotary hub 24 by means herein shown as a magnetic clamping element 28. Frame 20 supports a housing which has a horizontal slot 30 in a front panel 32 through which a disc may be inserted, as indicated in FIG. 1, with the dashed lines illustrating the path of insertion of the disc from an initial position outside the front panel 32. The disc drive 22 is located at a level below the horizontal slot 30 to receive a disc after the disc has been inserted through the slot 30.

According to this invention, the apparatus incorporates a device for transferring a disc to the disc drive 22 after it has been inserted through the slot 30 in the front panel 32 and for transferring the disc from the disc drive 22 and ejecting it through the slot 30 after the playing operation has been completed. For this purpose, a disc carrier plate 34 is mounted on the frame 20 for rotational and simultaneous vertical movement between a first level adjacent the slot 30 in the front panel 32 (as shown in FIG. 1) and a lower level below a disc positioned on the disc drive 22 (as shown in FIG. 9). The mounting for the disc carrier plate 34 includes a set of helical inclined ramp members 36 and cooperating set of bearing members 37, one set of the members being carried by the frame 20 and the other set of members being carried by the plate 34 such that a limited rotational movement of the disc carrier plate 34 in the counterclockwise direction (as viewed in FIG. 1), triggered by a disc when the disc reaches the end of its path of insertion, is translated to simultaneous vertical lowering movement of the carrier plate 34 which carries the disc to operating position on the disc drive 22.

Turning now to FIG. 3, one of the set of ramp members 36 is there shown rigidly attached to the underside of the disc carrier plate 34 while the frame 20 is provided with a slot 38 through which the ramp member 36 projects. The frame 20 is provided with a set of three slots 38 and the plate 34 is provided with a set of three ramp members 36 in the embodiment of the invention illustrated in FIG. 1. The ramp members 36 and slots 38 are curved so as to permit the ramp members 36 to pass easily down through the slots 38 as the carrier plate 34 is rotated, the edge at one end of each slot 38 providing a bearing member 37 engaging the inclined under edge 42 of the ramp member 36 in order to support the plate 34 and also to translate rotational movement of the plate 34 to helical movement thereof for transferring the disc.

While in the embodiment shown in FIGS. 1–9 the inclined ramp members 36 are rigidly attached to the plate 34, the ramp members 36 and bearing members 37 may be reversed, if desired, with the bearing members being carried by the plate and the ramp members being carried by the frame.

In order to produce the rotational movement of the carrier plate 34, in this embodiment of the invention the power to rotate the plate 34 is provided by a spring 44 attached to the frame 20 and the plate 34. The power spring 44 is under tension in the unloaded condition of the device shown in FIG. 1. Retainer means is provided to hold the plate against the power of the spring 44 and maintain the plate 34 at the level adjacent the horizontal slot 30 in position to receive a disc slid through the slot 30. This retainer means, in the present case, is shown as a pawl 46 carried by the disc and pivoted on a shaft 48, as shown in FIG. 4, and having a catch 50 which normally engages a stop arm 52 on the frame 20 to retain the plate 34. As the disc reaches the end of its path of insertion, it engages a raised lug 54 on the pawl 46, which is effective to pivot the pawl 46 and release the catch 50 from the stop arm 52 on the frame 20, which releases the carrier plate 34. The pawl 46 is held normally in an extreme counterclockwise position by a retainer spring 56 bent about the shaft and having one end abutting a pin 58 on the plate 34 and the other end engaging the lug 54 on the pawl 46. This retainer spring 56 pivots the pawl 46 counterclockwise and holds it against the stop arm 52 on the frame 20. When the disc is inserted and engages the pawl 46, the pawl 46 is rotated and releases the carrier plate 34 and the power spring 44 is effective to rotate the plate 34 counterclockwise. Such rotational movement is translated to helical movement of the plate 34 by the cooperating ramp members 36 and bearing members 37, which lowers the plate 34 and disc carried thereby toward the disc drive 22. Referring to FIGS. 5 and 6, the carrier plate 34 and disc are pictured advanced to an intermediate phase in the course of transferring the disc to the disc drive 22. As shown in these Figures, the disc is just above the rotary hub 24 and the ramp members 36 have lowered the disc carrier plate 34 approximately half way between the two levels.

Also referring to FIGS. 8–10, these Figures depict the carrier plate 34 in its fully lowered position after transfer of the disc to the disc drive 22 and the center hole 60 of the disc is shown received on the rotary hub 24 of the drive 22. A magnetic clamping element 62 is shown in clamping engagement with the rotary hub 24, to clamp the disc therebetween. As illustrated, the clamping element 62 may include magnetic material cooperating with magnetic material in the rotary hub 24 and may be carried by the bridge 64 which extends across and is mounted on the carrier plate.

To sense that the disc is in operating position on the disc drive 22, a limit switch 66 or the like may be mounted on the frame 20 for actuation by the carrier plate 34 or a member 68 projecting therefrom, as shown in FIG. 9.

Figure 11:
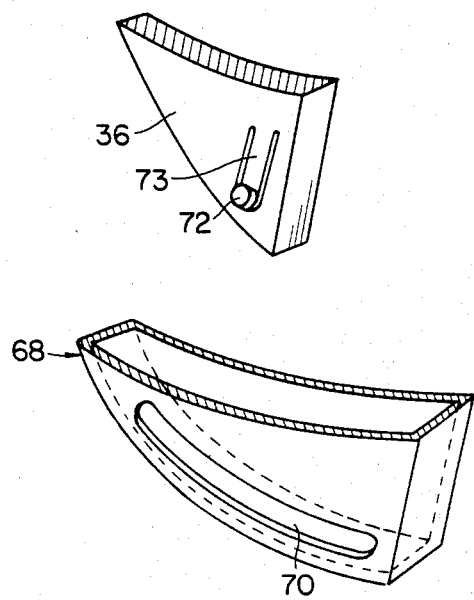
FIG. 11 is an exploded fragmentary perspective view of a portion of the ramp member and pocket of the frame in which the ramp member is received.

An alternative construction for the bearing members cooperating with the ramp members to guide the carrier plate is shown in FIG. 11, which illustrates that pockets 68 may be advantageously provided on the frame 20 for the inclined ramp members 36 and provided with guide slots 70 in the side walls of the pockets 68 for studs 72 carried by tangs 73 on the ramp members 36 to slide and provide bearing members to support, guide and constrain the movement of the ramp members. With the ramp members 36 constrained and the play between the members limited, it is possible to mount the apparatus so that the movable plate 34 is in a vertical plane instead of a horizontal plane. Whether the movable plate 34 is mounted in a horizontal or a vertical plane, in either case the disc is supported in an operating plane by the hub 24 for rotation about the central axis of the disc and is transferred to the hub from an initial plane, parallel to the operating plane, in which the disc is placed by inserting through the slot 38. The movement of the disc when it is transferred by the carrier plate 34 is along the rotary axis of the hub 24 and the movement of the carrier plate 34 during such transfer is helical.

Figure 12:
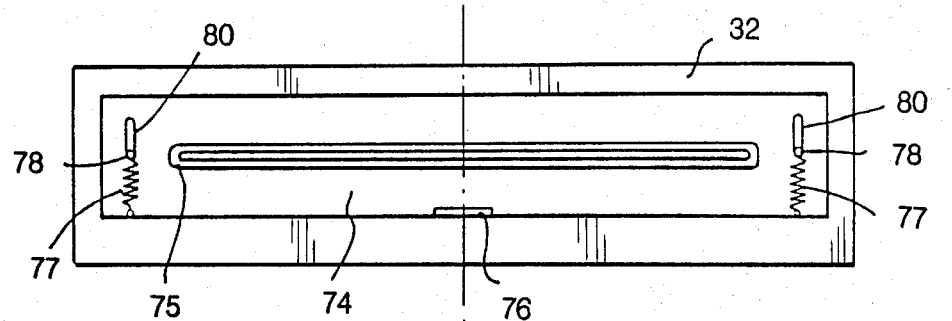
FIG. 12 is an enlarged fragmentary front elevational view of an alternative embodiment of the housing of the device as illustrated in FIG. 1.
Figure 13:
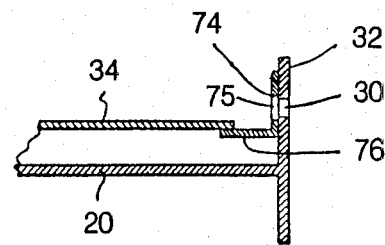
FIG. 13 is a fragmentary cross sectional view of the embodiment of the housing illustrated in FIG. 12.
Figure 14:
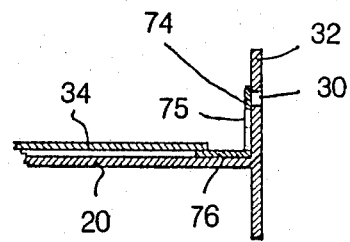
FIG. 14 is a fragmentary cross sectional view of the embodiment of the housing illustrated in FIG. 12 with the disc carrier plate advanced in phase.

As a further feature of the invention, referring to FIGS. 12–14, the housing may have mounted thereon, behind the front panel 32, a vertically slidable mask 74 having a horizontal slot 75 registering with the slot 30 in the front panel 32, as shown in FIG. 13, when the carrier plate 34 is in its raised position at the first level so as to allow a disc to be inserted. The mask 74 is lowered by engagement of a lug 76 by the carrier plate 34 and returned by means such as a pair of springs 77, to block the slot 30 when the disc is loaded on the disc drive 22, to make it impossible to insert another disc. The movement of the mask 74 may be defined by fixed studs 78 extending through elongated stud holes 80 in the mask 74 such that the mask slides up and down.

Now referring to FIGS. 15-17, an actuating mechanism is shown for transferring a disc from the disc drive to raise it for ejection through the slot 30 in the front panel 32 of the housing. As illustrated, a push rod 82 is provided which, when manually actuated against its return spring 83, is operative to rotate the carrier plate 34 clockwise, which is translated into vertical movement for raising and transferring the carrier plate 34 and a disc carried thereon from the operating level of FIG. 9 to the level of FIG. 1.

The push rod 82 is normally connected to rotate the plate 34 by a slide 84 on the push rod 82 and a pin 86 on the carrier plate 34. In apparatus wherein the disc is driven at high speed so that it must be stopped before being ejected, means are provided for disconnecting the slide 84 from the pin 86, as shown in FIG. 16. For this purpose, means are provided, such as a solenoid coil 88 energized from a source, to retract the slide 84 against a spring 89 to the position of FIG. 16, in which the push rod is free to move under manual actuation without rotating the plate 34. Rotation of the disc carrier plate 34 is translated by the ramp members 36 and cooperating bearing members 37 to helical movement to raise the carrier plate 34 and disc and transfer the disc to the level adjacent the horizontal slot 30 in the front panel 32 of the housing.

As the carrier plate 34 is rotated clockwise by actuation of the push rod 82 and simultaneously raised to the level of the horizontal slot 30, means are provided for acting on the disc carried by the plate 34 to eject it horizontally and cause it to project through the slot 30 in the front panel 32 of the housing from which it may then be removed manually. This movement of the disc to eject it through the slot 32 is caused by the retainer pawl 46, according to this embodiment of the invention, which is mounted on the carrier plate 34 and is rotated by the retainer spring 56 to move the disc. Referring to FIG. 5, it will be noted that, during the intermediate phase as the carrier plate 34 is being rotated clockwise, the pawl 46 is held by the fixed retainer arm 52 such that the lug 54 on one end of the pawl 46 is radially adjacent the edge of the disc. As will be clear from FIG. 4, as the carrier plate 34 rotates clockwise, the catch 50 on the other end of the pawl 46 turns to the left over the end of the fixed retainer arm 52, which is caused by the retainer spring 56, as the carrier plate 34 reaches the end of clockwise movement. This counterclockwise turning of the pawl 46 engages the lug 54 on the pawl 46 with the edge of the disc and urges it horizontally, to the right in FIGS. 1 and 4, to eject the disc through the slot 30.

Figure 21:
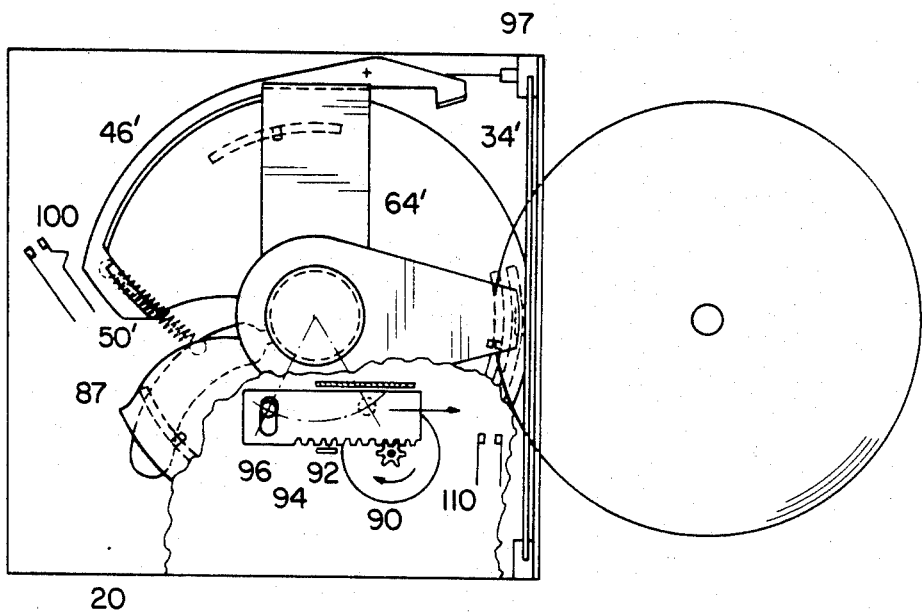
FIG. 21 is a horizontal plan view of the device shown in FIG. 18 with a disc partially inserted in the device and parts broken away to illustrate the motor for powering the device.

While in the embodiment of the invention heretofore described, powered means in the form of a spring 44 is utilized to operate the device, it is contemplated that other powered means may be used, such as an electrically operated drive motor. Referring to FIGS. 18, 21 and 22, a preferred embodiment of the invention is illustrated. FIG. 18 depicts the device in a state similar to FIG. 1 with a disc prior to being inserted and the path of insertion indicated by dashed lines. When the disc is inserted through the horizontal slot 30 in the front panel of the housing, as indicated in FIG. 21, the disc will slide across the carrier plate 34' toward a retainer pawl 46', which is held by a retainer spring 56' so that a catch 50' engages a radially extending edge 87 of a notch 88 in the carrier plate 34', to hold the plate against movement.

While, as illustrated, the carrier plate 34' may be a flat plate horizontally mounted within the apparatus, it is preferred that the carrier plate 34' have a shallow dished concave configuration so as to be engaged solely by the lateral edges of the disc as it is inserted. A preferred construction of this kind for a carrier plate 34' is disclosed in copending, commonly assigned application, Ser. No. 441,923, filed Nov. 15, 1982, entitled "Slot Type Disc Recorder And/Or Player Apparatus".

FIG. 21 also depicts a drive motor 90 which, when operated from an electrical source, is operable to rotate the carrier plate 34' counterclockwise. For this purpose, the motor 90 is connected by a pinion 92 on the motor shaft to a rack member 94 which is connected through a pin and slot connection 96 to the carrier plate 34' and is operative to rotate the carrier plate 34' counterclockwise when the motor 90 is rotated clockwise, as indicated by the arrows.

The disc, as it reaches the end of its path of insertion, is operative to engage and release the retainer pawl 46' and start the drive motor 90. To this end, the retainer pawl is in the form of a curved, L-shaped member pivotally mounted on the frame 20 for clockwise movement about an axis 97 from the position of FIG. 21 to the position of FIG. 22. As the retainer pawl 46' moves clockwise and the catch 50' provided by the bottom leg of the pawl 46' moves radially away from the disc, a switch 100 is engaged and closed to start the drive motor 90 for the device. The outer edge 102 of the carrier plate 34' engages the tip 104 of the catch 50' of the pawl 46' as the carrier plate 34' rotates counterclockwise to hold the pawl 46' clear of the disc, as indicated in FIG. 22.

As in the prior embodiment of the invention, ramp members 36' carried on the underside of the carrier plate 34' project through slots 33' in the frame 20, providing bearing members 37' cooperating with the ramp members 36' to translate rotational movement in the clockwise direction of the carrier plate 34' to vertical lowering movement of the carrier plate 34'. In the course of lowering movement of the carrier plate 34', the disc carried thereby is lowered into position on a rotary hub 24 of the disc drive 22. The intermediate phase of the ramp member 36' and cooperating bearing member 37' on the frame 20 is shown in FIG. 24 and the ramp member 36' and bearing member 37' are shown in the advanced operating position wherein the disc is on the disc drive 22 in FIG. 25.

The bridge 64' extending across the carrier plate 34' is also utilized to support a clamping element 62' for clamping the disc to the rotary hub 24 of the disc drive 22. A preferred form of clamping assembly is illustrated in the embodiment of the invention shown in FIGS. 18-21, having a clamping element 62' including magnetic material which is adapted to cooperate with magnetic material included in the rotary hub 24. When the clamping element 62' is lowered to a position adjacent the hub 24 as the carrier plate 34' is lowered, the magnetic interaction between the rotary hub 24 and clamping element 62' causes the clamping element 62' in the bridge 64' to be drawn into engagement with the rotary hub 24 and with the disc sandwiched therebetween. The preferred form of clamping assembly is disclosed in Belgian Pat. No. 892.073 and described therein in detail. As will be noted from FIG. 19, in the position of the carrier plate at the level of the horizontal slot 30 in the front panel, it is desired to maintain the clamping element 62' above the bridge 64' as shown in FIG. 19, so that it does not project below the under surface of the bridge 64' and obstruct the disc as it is inserted horizontally into position on the carrier plate 34'. For this purpose, the clamping element 62' extends through without touching an opening 106 in the bridge 64' which is defined by a ring 108 of magnetic material fixed in the bridge 64'. This magnetic ring 108 cooperates with the magnetic material in the clamping element 62' to levitate the element 62' to the position of FIG. 19 in the raised position of the carrier plate and bridge. As the bridge 64' is lowered during the course of lowering the carrier plate 34' to operating position, which position is shown in FIG. 23, the magnetic material included in the clamping element 62' cooperates with the magnetic material included in the rotary hub 24 to overcome the levitating magnetic force exerted by the ring 108 and cause the clamping element to lower through the opening 106 in the bridge 64' and enter into clamping engagement with the rotary hub 24.

The achievement of the operating position by the carrier plate 34' may be sensed by a limit switch 110 engaged by the rack member 94 and closed to de-energize the drive motor 90 for the device. At the conclusion of the playing operation, the drive motor 90 may be energized from a source to rotate in a counterclockwise direction and, via the rack member 94, to rotate the carrier plate 34' clockwise. The movement of the carrier plate 34' clockwise through the intermediate phase illustrated in FIG. 22, via the cooperating ramp members 36' and bearing members 37', translates the rotational movement to helical movement of the carrier plate 34', causing it to raise vertically and carry the disc from operating position on the disc drive 22. The raising of the carrier plate 34' and bridge 64' is also operative to engage the clamping element 62' and raise it from the rotary hub 24 and to thereafter lift the disc from the rotary hub 24 to carry it with the carrier plate 34' vertically upward through the intermediate phase of FIG. 22 to the initial phase wherein the carrier plate 34' is in the position of FIGS. 18 and 21. The retainer pawl 46', under the force of the tension spring 44' acting on the pawl 46', is operative to engage the edge 87 of the plate 34' when the carrier plate reaches the level of the horizontal slot 30 in the housing and cause the disc to be moved outwardly through the slot and project from the slot to be retrieved manually.

I claim:

1. A loading and unloading device for a slot type disc player comprising:
   a frame having a horizontal slot for a disc;
   disc drive means on said frame at a level below said slot and having a rotary axis;
   a disc carrier plate independent of said disc drive means vertically movable from a first level adjacent said slot to receive or to eject a disc through said slot and a lower level below a disc position on said disc drive means; and
   means mounting said disc carrier plate on said frame for simultaneous rotational and vertical movement providing helical movement between said levels about the axis of the disc drive means to transfer a disc between said disc carrier plate and said disc drive means.

2. A device according to claim 1 in which said mounting means for supporting said disc carrier plate on said frame includes a helical ramp member and a bearing member cooperating with said helical ramp member for translating rotational movement of said carrier plate to simultaneous vertical movement thereof.

3. A device according to claim 2 in which said helical ramp member is rigid with said carrier plate, and said frame includes a bearing member cooperating with said ramp member for translating rotational movement of said carrier plate to simultaneous vertical movement thereof.

4. A device according to claim 2 in which one of said members is on said frame and the other of said members is on said plate.

5. A device according to claim 1 in which said mounting means includes means for translating rotational movement of said carrier plate to either raising or lowering vertical helical movement of said plate between said levels according to the direction of rotation.

6. A device according to claim 5 including retainer means for retaining said disc carrier plate in the raised position at said first level adjacent said horizontal slot, and means for releasing said retainer means upon engagement by a disc inserted through said slot when the latter reaches the end of its path of insertion.

7. A device according to claim 5 including powered means for rotating said plate in at least one direction.

8. A device according to claim 7 wherein said powered means for rotating said plate in at least one direction and said mounting means cooperate to lower said plate, and in which manually actuable means are included for rotating said plate in the opposite direction and cooperate with said mounting means to raise said plate.

9. A device according to claim 7 wherein said powered means includes a motor for rotating said plate in at least one direction.

10. A device according to claim 7 including powered means for rotating said plate in both directions.

11. A device according to claim 5 in which said retainer means is operative to eject a disc through said slot after transfer by said carrier plate to the level of said slot.

12. A device according to claim 5 including means for ejecting a disc through said slot after transfer by said carrier plate from said disc drive to said first level adjacent said slot.

13. A device according to claim 5 including powered means operative in response to the insertion of a disc through said slot to said device to rotate said carrier plate to lower said plate and transfer said disc to said disc drive.

14. A device according to claim 13 including powered means for rotating said carrier plate to raise said plate and transfer said disc from said disc drive to said first level adjacent said slot.

15. A device according to claim 14 including means for ejecting a disc through said slot after transfer by said carrier plate from said disc drive to said first level adjacent said slot.

16. A loading and unloading device for a slot type disc player comprising:
   a frame having a slot for a disc;
   disc drive means on said frame displaced from said slot and having a rotary axis;
   a disc carrier plate movable independently of said disc drive means from a first position adjacent said slot to receive or to eject a disc through said slot and a second position adjacent a disc positioned on said disc drive means; and means mounting said disc carrier plate on said frame for rotational movement including means for translating rotational movement to helical movement about the axis of the disc drive means between said positions to transfer a disc between said disc carrier plate and said disc drive means.

17. A device according to claim 16 in which said mounting means for supporting said disc carrier plate on said frame includes a helical ramp member and a bearing member cooperating with said helical ramp member for translating rotational movement of said carrier plate to helical movement thereof.

18. A device according to claim 17 in which said helical ramp member is rigid with said carrier plate and said frame includes a bearing member cooperating with said ramp member for translating rotational movement of said carrier plate to helical movement thereof.

19. A device according to claim 16 in which said mounting means includes means for translating rotational movement in either direction of said carrier plate to helical movement of said plate between said positions according to the direction of rotation.

20. A device according to claim 19 including powered means for rotating said carrier plate.

21. A device according to claim 20 in which said powered means is operative to rotate said carrier plate in either direction.

22. A device according to claim 16 including means for ejecting a disc through said slot after transfer by said carrier plate from said disc drive means to said first position adjacent said slot.

23. A loading and unloading device for a disc player comprising:
a frame;
disc drive means on said frame including a rotary hub for supporting a disc in an operating plane for rotation about an axis;
a disc carrier plate independent of said rotary hub rotationally mounted on said frame for movement about an axis and located to receive a disc in an initial plane parallel to and spaced from said operating plane;
means connected to said carrier plate cooperating with means connected to said frame for translating rotational movement of said carrier plate about the axis of the hub to helical movement of said carrier plate to transfer a disc between said planes to and from support by said hub; and
means for rotating said disc carrier plate to transfer a disc.

24. A device according to claim 23 in which said translating means includes a helical ramp member and a bearing member cooperating with said helical ramp member for translating rotational movement of said carrier plate to helical movement thereof.

25. A device according to claim 24 in which said helical ramp member is connected to said carrier plate and said frame includes a bearing member connected to said frame and cooperating with said ramp member for translating rotational movement of said carrier plate to helical movement thereof.

26. A device according to claim 24 in which said translating means operates to translate rotational movement in either direction of said carrier plate to helical movement of said plate between said positions according to the direction of rotation.

27. A device according to claim 26 including powered means for rotating said carrier plate.

28. A device according to claim 27 in which said powered means is operative to rotate said carrier plate in either direction.

* * * * *